United States Patent
Brew et al.

(10) Patent No.: US 9,475,245 B2
(45) Date of Patent: Oct. 25, 2016

(54) HONEYCOMB EXTRUSION APPARATUS AND METHODS

(75) Inventors: Thomas William Brew, Corning, NY (US); Timothy Michael Miller, Elmira, NY (US)

(73) Assignee: Corning Incorporated, Corning, NY (US)

(*) Notice: Subject to any disclaimer, the term of this patent is extended or adjusted under 35 U.S.C. 154(b) by 1193 days.

(21) Appl. No.: 13/466,544

(22) Filed: May 8, 2012

(65) Prior Publication Data

US 2013/0300016 A1 Nov. 14, 2013

(51) Int. Cl.
*B29D 99/00* (2010.01)
*B29C 47/00* (2006.01)
(Continued)

(52) U.S. Cl.
CPC ............ *B29D 99/0089* (2013.01); *B28B 3/269* (2013.01); *B28B 3/2681* (2013.01); *B28B 17/0072* (2013.01); *B29C 47/124* (2013.01); *B30B 11/221* (2013.01); *B28B 3/20* (2013.01); *B28B 3/2636* (2013.01); *B28B 3/2672* (2013.01); *B28B 2003/203* (2013.01); *B29C 47/0028* (2013.01); *B29C 47/0859* (2013.01); *B29C 47/0871* (2013.01); *B29C 47/1009* (2013.01); *B29C 47/22* (2013.01); *B29C 47/92* (2013.01); *B29C 2947/926* (2013.01); *B29D 24/005* (2013.01); *B29D 24/007* (2013.01); *C04B 38/0006* (2013.01); *C04B 38/0009* (2013.01)

(58) Field of Classification Search
None
See application file for complete search history.

(56) References Cited

U.S. PATENT DOCUMENTS 4,298,328 A * 11/1981 Frost ............... B28B 3/269
264/209.1
4,710,123 A * 12/1987 Ziebig .............. B28B 3/269
425/464

(Continued)

FOREIGN PATENT DOCUMENTS

CN 101437600 5/2009
EP 1 245 359 10/2002
(Continued)

OTHER PUBLICATIONS

Patent Cooperation Treaty International Notification of Transmittal of the International Search Report and the Written Opinion of the International Searching Authority, international application No. PCT/US2013/039653; mailing date Nov. 15, 2013, 15 pages.
(Continued)

*Primary Examiner* — Jeffrey Wollschlager
(74) *Attorney, Agent, or Firm* — Joseph M. Homa; Charles Greene (57) ABSTRACT

A honeycomb extrusion apparatus includes a die body and a mask defining a peripheral gap. The peripheral gap includes a first extrusion cross section at a first radial location relative to the extrusion axis and a second extrusion cross section at a second radial location relative to the extrusion axis. An overall flow area of the first extrusion cross section is less than an overall flow area of the second extrusion cross section. In further examples, methods include co-extruding a honeycomb body with an integral skin with the overall flow area of the first extrusion cross section being less than the overall flow area of the second extrusion cross section. In further examples, methods include compensating for different skin flow characteristics associated with a particular honeycomb network configuration of discharge slots in a die body.

11 Claims, 6 Drawing Sheets

(51) Int. Cl.
  *B28B 17/00* (2006.01)
  *B29C 47/12* (2006.01)
  *B30B 11/22* (2006.01)
  *C04B 38/00* (2006.01)
  *B29C 47/08* (2006.01)
  *B29C 47/22* (2006.01)
  *B28B 3/20* (2006.01)
  *B28B 3/26* (2006.01)
  *B29D 24/00* (2006.01)
  *B29C 47/10* (2006.01)
  *B29C 47/92* (2006.01)

(56) References Cited

U.S. PATENT DOCUMENTS

| | | | | |
|---|---|---|---|---|
| 4,915,612 A * | 4/1990 | Gangeme | ............... | B28B 3/269 264/177.1 |
| 5,089,203 A * | 2/1992 | Kragle | ................ | B28B 3/269 264/177.11 |
| 5,256,054 A * | 10/1993 | Cocchetto | .............. | B28B 3/269 264/177.12 |
| 5,906,839 A * | 5/1999 | Miura | ................ | B28B 3/269 264/177.12 |
| 5,942,260 A * | 8/1999 | Kodama | ............... | B28B 3/269 264/177.12 |
| 5,980,227 A * | 11/1999 | Murata | ................ | B28B 3/26 264/177.12 |
| 7,575,793 B2 | 8/2009 | Aniolek et al. | | |
| 7,597,948 B2 * | 10/2009 | Miller | ................ | B01D 46/247 428/116 |
| 7,914,724 B2 * | 3/2011 | Bookbinder | ........ | B29C 47/0028 264/177.11 |
| 2002/0098320 A1 * | 7/2002 | Beall | ............... | B01J 35/04 428/116 |
| 2003/0001308 A1 * | 1/2003 | Shibagaki | ............... | B28B 3/269 264/177.11 |
| 2004/0197434 A1 | 10/2004 | Lubberts | ........................ | 425/380 |
| 2006/0198984 A1 * | 9/2006 | Aoki | ................... | B01D 46/2451 428/116 |
| 2007/0175178 A1 * | 8/2007 | Miller | .................. | B01D 46/247 52/793.1 |
| 2009/0028980 A1 * | 1/2009 | Asaoka | ............... | B29C 47/0028 425/382 R |
| 2009/0028981 A1 * | 1/2009 | Asaoka | .................. | B28B 3/269 425/461 |
| 2009/0186116 A1 * | 7/2009 | Saito | .......................... | B28B 3/26 425/463 |
| 2010/0301514 A1 * | 12/2010 | Lehman | .................. | B28B 3/269 264/166 |
| 2011/0128370 A1 * | 6/2011 | Booth | .................. | G01N 21/952 348/125 |
| 2011/0204544 A1 * | 8/2011 | Foster | .................... | B28B 3/269 264/177.12 |

FOREIGN PATENT DOCUMENTS

GB 2 172 841 10/1986
JP 2006-239603 9/2006

OTHER PUBLICATIONS

Chinese application No. 201380023906.9, dated Feb. 1, 2016, Notice on the First Office Action (PCT Application in the National Phase), 11 pgs.

* cited by examiner

HONEYCOMB EXTRUSION APPARATUS AND METHODS

FIELD

The present disclosure relates generally to honeycomb extrusion apparatus and methods and, more particularly, to honeycomb extrusion apparatus and methods for co-extruding a honeycomb body with an integral skin.

BACKGROUND

Conventional honeycomb extrusion apparatus are known to be used to co-extrude a skin and a central portion of a honeycomb body. However, conventional techniques may result in uneven skin characteristics about the periphery of the honeycomb body.

SUMMARY

In one aspect, a honeycomb extrusion apparatus comprises a die body including an array of pins that are spaced apart to define an extrusion face with a honeycomb network of discharge slots extending along an extrusion axis of the die body. The die body further includes an outer peripheral surface facing away from the extrusion axis and circumscribing the extrusion face. The honeycomb extrusion apparatus further includes a mask including an inner peripheral surface at least partially circumscribing the outer peripheral surface of the die body. A peripheral gap is defined between the inner peripheral surface and the outer peripheral surface and circumscribes the array of pins. The peripheral gap includes a first extrusion cross section at a first radial location relative to the extrusion axis. The peripheral gap further includes a second extrusion cross section at a second radial location relative to the extrusion axis. An overall flow area of the first extrusion cross section is less than an overall flow area of the second extrusion cross section.

In another aspect, a method of co-extruding a central portion of a honeycomb body with an integral skin includes the step (I) of providing a die body including an array of pins that are spaced apart to define an extrusion face with a honeycomb network of discharge slots extending along an extrusion axis of the die body. The die body further includes an outer peripheral surface facing away from the extrusion axis and circumscribing the extrusion face. The honeycomb network of discharge slots at least partially defines a first skin flow characteristic at a first location of the outer peripheral surface. The honeycomb network of discharge slots further at least partially defines a second skin flow characteristic at a second location of the outer peripheral surface that is spaced from the first location in a direction about the extrusion axis. The first skin flow characteristic is different than the second skin flow characteristic. The method further includes the step (II) of providing a mask including an inner peripheral surface and the step (III) of mounting the mask to the die body such that the inner peripheral surface at least partially circumscribes the outer peripheral surface of the die body to define a peripheral gap between the inner peripheral surface and the outer peripheral surface that circumscribes the array of pins. The peripheral gap includes a first extrusion cross section associated with the first location of the outer peripheral surface. The peripheral gap also includes a second extrusion cross section associated with the second location of the outer peripheral surface. An overall flow area of the first extrusion cross section is less than an overall flow area of the second extrusion cross section. The method also includes the step (IV) of extruding a quantity of batch material through an overall peripheral flow area of the peripheral gap while extruding another quantity of the batch material through the honeycomb network of discharge slots such that a central portion of the honeycomb body is co-extruded with an integral skin defining an outer periphery of the honeycomb body.

In yet another aspect, a method is provided to compensate for different skin flow characteristics associated with a particular honeycomb network configuration of discharge slots in a die body. The method includes the step (I) of providing a die body including an array of pins that are spaced apart to define an extrusion face with a honeycomb network of discharge slots extending along an extrusion axis of the die body. The die body further includes an outer peripheral surface facing away from the extrusion axis and circumscribing the extrusion face. The honeycomb network of discharge slots defines a first skin flow characteristic at a first location of the outer peripheral surface and a second skin flow characteristic at a second location of the outer peripheral surface spaced from the first location in a direction about the extrusion axis. The method further includes the step (II) of providing a mask including an inner peripheral surface and the step (III) of mounting the mask to the die body such that the inner peripheral surface at least partially circumscribes the outer peripheral surface of the die body to define a peripheral gap between the inner peripheral surface and the outer peripheral surface that circumscribes the array of pins. The peripheral gap includes a first extrusion cross section associated with the first location of the outer peripheral surface, and the peripheral gap includes a second extrusion cross section associated with the second location of the outer peripheral surface. An overall flow area of the first extrusion cross section is arranged to be less than an overall flow area of the second extrusion cross section to at least partially compensate for a difference between the first skin flow characteristic and the second skin flow characteristic.

BRIEF DESCRIPTION OF THE DRAWINGS

These and other features, aspects and advantages of the claimed invention are better understood when the following detailed description is read with reference to the accompanying drawings, in which:

DETAILED DESCRIPTION

Aspects of the claimed invention will now be described more fully hereinafter with reference to the accompanying drawings in which example embodiments of the claimed invention are shown. Whenever possible, the same reference numerals are used throughout the drawings to refer to the same or like parts. However, the claimed invention may be embodied in many different forms and should not be construed as limited to the embodiments set forth herein. These example embodiments are provided so that this disclosure will be both thorough and complete, and will fully convey the scope of the claimed invention to those skilled in the art.

A honeycomb body an integral skin can be formed from a batch of a wide variety of materials such as ceramic mixtures. Example the batch material can comprise a ceramic mixture as a paste and/or slurry, such as particles and/or powders mixed with polymer binders and/or low molecular weight liquids and combinations of these and other materials, such as for forming a cement slurry. Various batch materials may be provided that comprise ceramic or ceramic forming material.

As set forth in the figures, example honeycomb extrusion apparatus and methods are provided to allow co-extruding a honeycomb body and integral skin. Honeycomb bodies can include various structures defining a network of cells, whatever the geometry of the cells may be. For example, the cells can comprise curvilinear cells, such as circular, oval or other curvilinear shapes. In further examples, the cells can comprise triangular, rectangular (e.g., square) or other polygonal shapes. Once extruded, the honeycomb body may be later fired into a honeycomb ceramic body. The honeycomb ceramic body can then be further processed for various filtering applications, including, for example, particulate filters and/or catalytic substrates for processing exhaust from a combustion engine.

Figure 1:
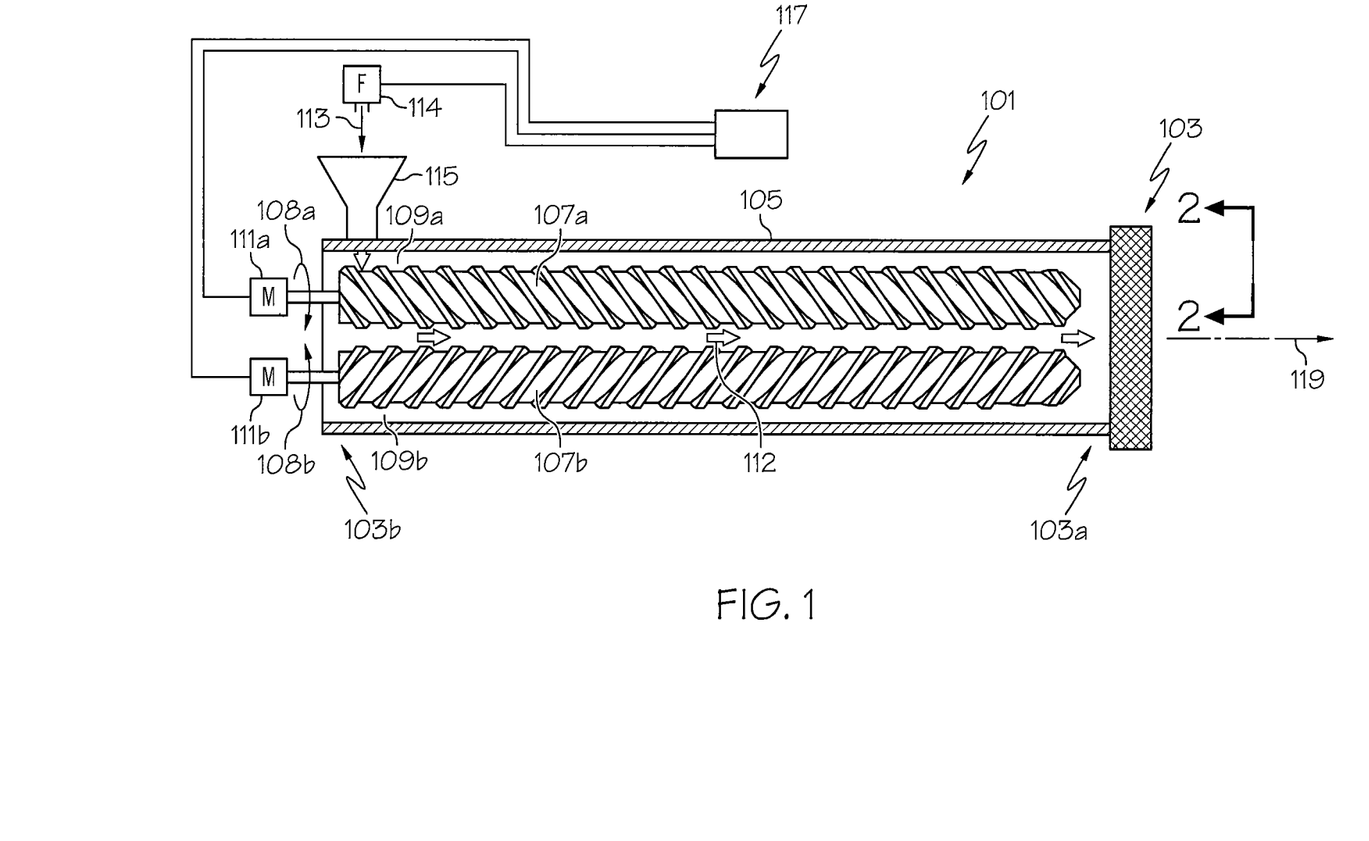
FIG. 1 is a schematic view of an example honeycomb extrusion apparatus in accordance with aspects of the present disclosure.

As shown, the honeycomb extrusion apparatus 101 can considered a die apparatus 103 either alone (e.g. FIGS. 2-6) or in combination with other components (e.g., schematically illustrated in FIG. 1). For instance, as shown schematically in FIG. 1, the honeycomb extrusion apparatus 101 can include the die apparatus 103 mounted to a downstream end 103a of the barrel 105. The honeycomb extrusion apparatus 101 can further include one or more screws 107a, 107b rotatably mounted within the barrel 105. In one example embodiment, the barrel 105 can be shaped to provide a plurality of chambers 109a, 109b that each house a respective screw 107a, 107b rotatably mounted within and in communication with one another at a central portion of the barrel 105. The screws 107a, 107b are powered by at least one drive mechanism 111a, 111b (e.g., motors).

In the illustrated example, one screw 107a includes right-handed threads while the other screw 107b includes left-handed threads. In such a configuration the drive mechanism 111a, 111b can rotate the right-handed screw 107a in a clockwise direction 108a and the left-handed screw 107b in a counterclockwise direction 108b to drive batch material 113 along the barrel 105 from the upstream end 103b in a direction 112 toward the downstream end 103a to be extruded by the die apparatus 103. Although not shown, in further examples, the screws 107a, 107b can each have screw threads provided in the same direction (i.e., both left-handed screws or both right-handed screws) wherein the respective drive mechanisms are configured to rotate the screws 107a, 107b in the same direction to similarly drive the batch material 113 along the barrel 105 along direction 112 to be extruded by the die apparatus 103.

The die apparatus 103 is configured to extrude the batch material 113 in the desired shape, e.g., a honeycomb body along extrusion direction 119. Near the upstream end 103b, a supply port 115 may be provided to allow the batch material 113 from a feeder 114 to enter the chambers 109a, 109b. While this example embodiment shows the supply port 115 at one location near the upstream end 103b, alternate embodiments may provide the supply port 115 further downstream from the upstream end 103b.

The honeycomb extrusion apparatus 101 may optionally include a control system with various configurations. In the illustrated example, the control system 117 can be configured to adjust a rotation rate of the screws 107a, 107b by way of the driving mechanisms 111a, 111b and/or adjust the feed rate of the batch material 113 introduced by the feeder 114.

Figure 2:
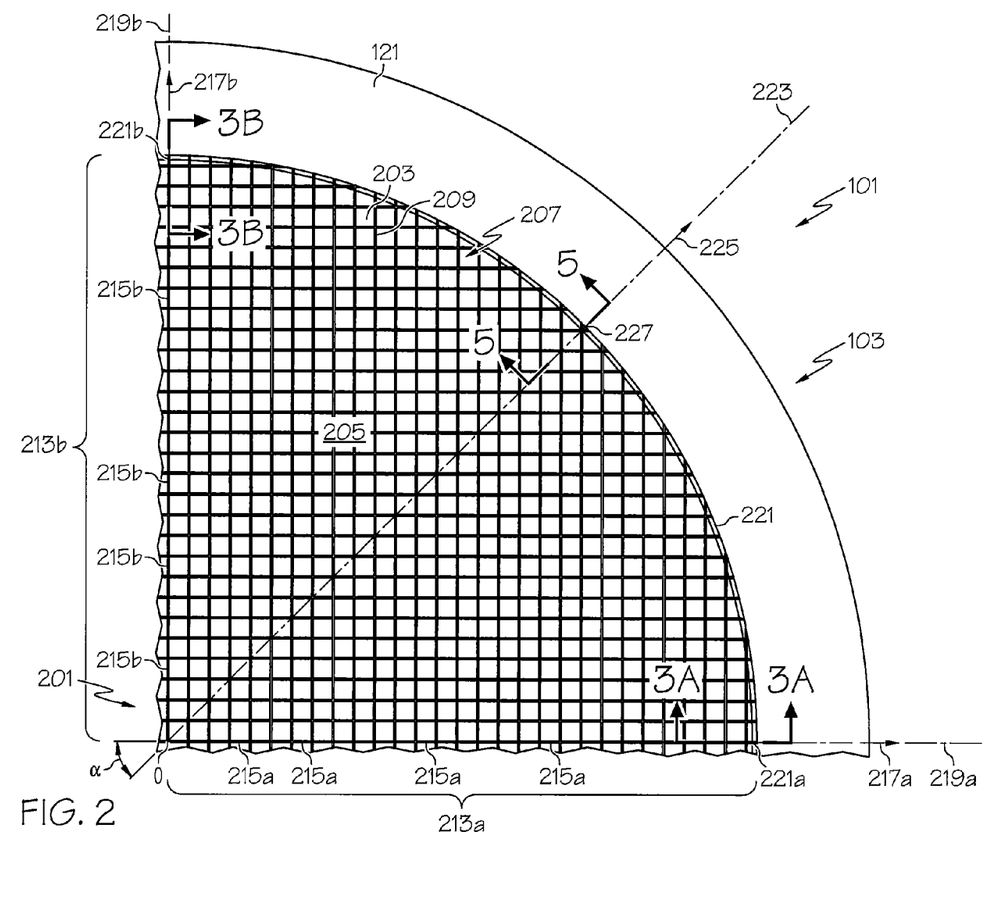
FIG. 2 is a partial plan view of an example die apparatus of the example honeycomb extrusion apparatus along line 2-2 of FIG. 1.

FIG. 2 is a partial plan view of an example die apparatus 103 of an example honeycomb extrusion apparatus 101 along line 2-2 of FIG. 1. FIG. 2 illustrates a first quadrant of just one example die apparatus 103. Although not shown, the second quadrant can be a mirror image of the first quadrant about a vertical axis. Moreover, the third and fourth quadrants can be a mirror image of the first and second quadrants, respectively, about a horizontal axis.

Figure 3:
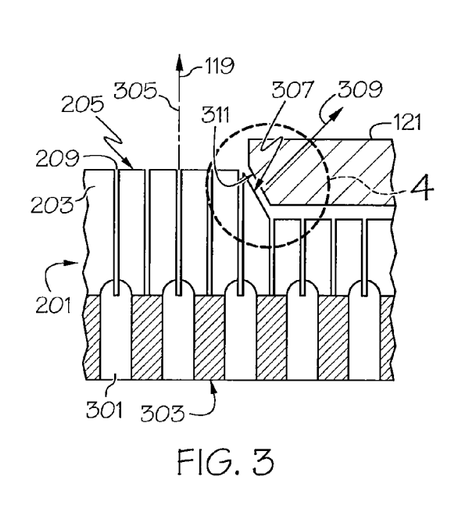
FIG. 3 is a sectional view of the die apparatus along line 3A-3A and line 3B-3B of FIG. 2.

The die apparatus 103 of the honeycomb extrusion apparatus 101 can include a die body 201 including an array of die pins 203 that are spaced apart to define an extrusion face 205 with a honeycomb network 207 of discharge slots 209. As shown in FIG. 3, the die body 201 can also include feed holes 301 for providing communication between an inlet face 303 and the discharge slots 209. As shown in FIG. 3, in one example, the feed holes 301 can be offset for direct fluid communication with every other discharge slot intersection along each row of discharge slots. The feed holes 301 can also be offset for direct communication with every other discharge slot intersection along each column of discharge slots. Various machining techniques may be used to generate various feedhole and discharge slot configurations. In one example, the feed holes may be bored into the inlet face 303. Next, various machining techniques are used to form the rows and columns of discharge slots to intersect with the feed holes 301. Various example techniques to form the discharge slots can include wire electronic discharge machining (i.e., wire "EDM"), plunge EDM, grinding, or other machining techniques.

As shown in FIG. 2, the discharge slots 209 may each be provided with substantially the same thickness. Providing the discharge slots 209 with substantially the same thickness can reduce material costs, weight and may enhance performance of the filter while still achieving a honeycomb body that is durable and provides sufficient performance characteristics. In alternative examples, discharge slots 209 may include a varying thickness. For instance, the thickness of the slots within a central area of the extrusion face 205 may include a smaller thickness than discharge slots 209 located about a peripheral region of the extrusion face 205. Providing peripheral discharge slots with a greater thickness than central discharge slots can create a honeycomb body with cell walls that have an increased thickness at the periphery than the central portion of the honeycomb body. In such examples, the increased thickness may enhance integral attachment between the skin and the central portion of the honeycomb body. In addition, the increased thickness of the outer peripheral cell walls can increase the strength of the outer periphery of the honeycomb body when compared to honeycomb bodies with cell walls including substantially the same reduced thickness.

As shown in FIG. 3, the discharge slots 209 can each extend along an extrusion axis 305 of the die body 201. For example, as shown the discharge slots 209 can extend along the extrusion direction 119 that is coincident or parallel to the extrusion axis 305 of the die body 201. The die pins 203 can include a wide range of shapes and sizes in order to define the honeycomb network 207 of discharge slots 209 with the desired configuration to produce corresponding honeycomb bodies with the desired cell structure. As shown in FIG. 2, each of the die pins 203 may be provided as a square shaped die pin although, in addition or alternatively, the die pins can include other shapes. For example, the die pins can include a polygonal shape with three or more sides such as a triangular shape, a rectangular shape (e.g., see the illustrated square shape), a pentagonal shape, a hexagonal shape or other polygonal shape. In further examples, the pin can include curvilinear shapes, such as circular, oval or other curvilinear shapes.

With the square die pin configuration of FIG. 2, the discharge slots 209 can include a first set 213a of discharge slots 215a that each extend along a first slot direction 217a. A first slot plane 219a extends along the first slot direction 117a and includes a first radial location 221a of a peripheral gap 211 discussed more fully below. FIG. 3 is a partial cross section of the die body 201 of FIG. 2 taken along the first slot plane 219a at line 3A-3A of FIG. 2. The first slot plane 219a can extend along the extrusion direction 119 and can extend substantially perpendicular to the extrusion face 205 of the die body 201.

The discharge slots 209 can also include a second set 213b of discharge slots 215b that each extend along a second slot direction 217b. A second slot plane 219b can extend along the second slot direction 117b and includes another first radial location 221b of the peripheral gap 211. FIG. 3 can also be representative of the partial cross section of the die body 201 of FIG. 2 taken along the second slot plane 219b at line 3B-3B of FIG. 2. The second slot plane 219b can also extend along the extrusion direction 119 and can extend substantially perpendicular to the extrusion face 205 of the die body 201. As shown, the first slot plane 219a and the second slot plane 219b can intersect one another along an origin "O", wherein slot planes 219a, 219b intersect at line extending in the extrusion direction 119 along the extrusion axis 305. As shown, in some examples, the symmetrical axis of the die body can extend along the line defined by the intersecting slot planes 219a, 219b that pass through the origin "O".

Figure 10:
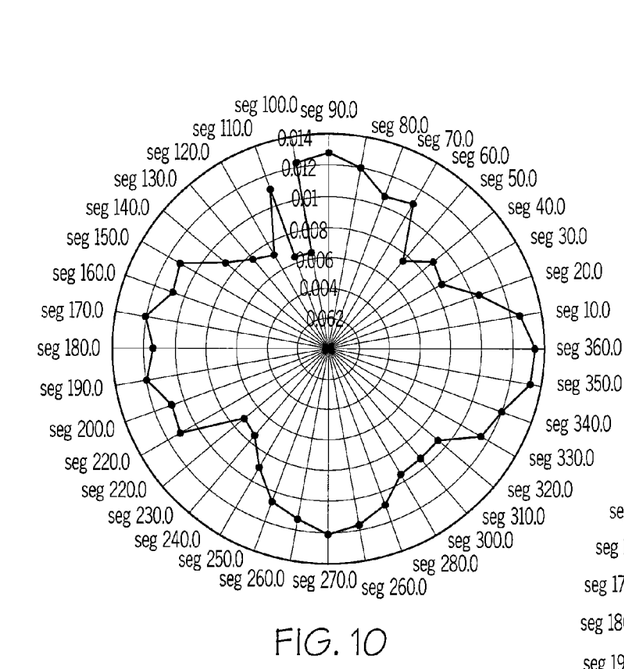
FIG. 10 is an example measured skin profile thickness of a honeycomb body extruded with a conventional peripheral gap.
Figure 11:
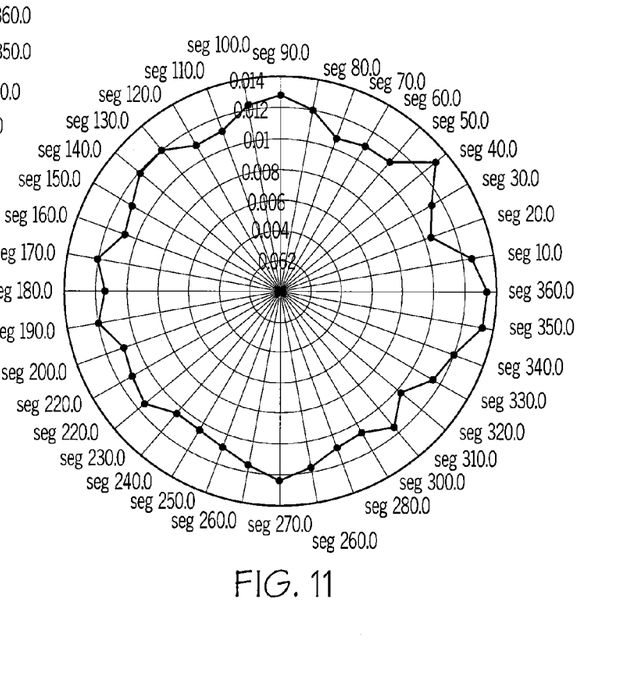
FIG. 11 is an example measured skin profile thickness of a honeycomb body extruded with a peripheral gap in accordance with aspects of the disclosure.

With the square die pin configuration, FIG. 3 is representative of four cross sections of the die body 201 at the 0°, 90°, 180°, and 270° positions (e.g., see 221a, 221b in FIG. 2 and also the respective positions shown in FIGS. 10 and 11). Indeed, with reference to FIG. 2, the first slot cross section can be taken along the first slot plane 219a at line 3A-3A of FIG. 2 at what can be called the 0° positional location between the first quadrant shown in FIG. 2 and the fourth quadrant (not shown). With further reference to FIG. 2, the second slot cross section can be taken along the second slot plane 219b at line 3B-3B of FIG. 2 at what can be called the 90° positional location between the first quadrant shown in FIG. 2 and the second quadrant (not shown). Although not shown, the third slot cross section can also be taken along the first slot plane 219a at what can be called the 180° positional location between the second quadrant (not shown) and the third quadrant (not shown). Still further, although not shown, the fourth cross section can also be taken along the second slot plane 219b at what can be called the 270° positional location between the third quadrant (not shown) and the fourth quadrant (not shown). As such, the first radial location of the die apparatus 103 can be considered four first radial locations with two of the first radial locations 221a, 221b respectively located at that 0° and 90° positional locations of the peripheral gap 211 with the remaining two first radial locations (not shown) respectively located at the 180° and 270° positional locations of the peripheral gap 211.

Figure 5:
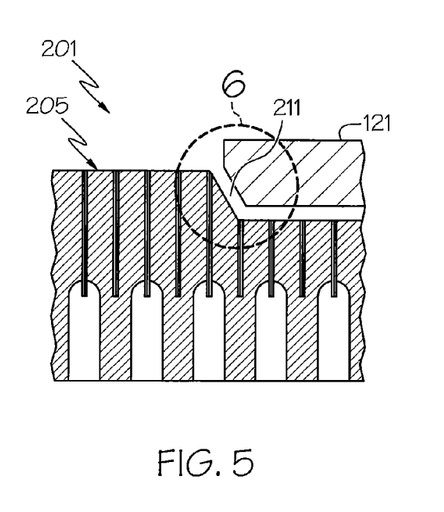
FIG. 5 is another sectional view of the die apparatus along line 5-5 of FIG. 2.

In further examples, transverse pin plane 223 extending along a transverse pin direction 225 and includes a second radial location 227 of a peripheral gap 211 discussed more fully below. FIG. 5 is a partial cross section of the die body 201 of FIG. 2 taken along the transverse pin plane 223 at line 5-5 of FIG. 2. The transverse pin plane 223 can also extend along the extrusion direction 119 and can extend substantially perpendicular to the extrusion face 205 of the die body 201.

As shown in FIG. 2, the transverse pin plane does not extend along any of the slot directions (e.g., 217a, 217b). As shown, the transverse pin plane 223 and the slot planes 219a, 219b can all intersect one another along an origin "O", wherein the transverse pin plane 223 and slot planes 219a, 219b intersect at line extending in the extrusion direction 119 along the extrusion axis 305. As shown, in some examples, the symmetrical axis of the die body can extend along the line defined by the intersecting transverse pin plane 223 and slot planes 219a, 219b that pass through the origin "O".

With the square die pin configuration, as shown in FIG. 2, the transverse pin plane 223 can optionally intersect the first slot plane 219a at about an angle α of about 45°. With such an orientation, the transverse pin plane 223 can comprise a diagonal pin plane that bisects diagonally disposed corners of a series of square die pins.

Furthermore, with the square die pin configuration, FIG. 5 can be representative of four cross sections of the die body 201 at angles α of 45°, 135°, 225°, and 315°. Indeed, with reference to FIG. 2, the first transverse pin cross section can be taken along the first transverse pin plane 223 at line 5-5 of FIG. 2 at what can be called the 45° positional location within the first quadrant shown in FIG. 2. The second transverse pin cross section can be taken along the second transverse pin plane (not shown) at what can be called the 135° positional location within the second quadrant. Additionally, the third transverse pin cross section can also be taken along the first transverse pin plane 223 at what can be called the 225° positional location within the third quadrant. The fourth transverse pin cross section can be taken along the second transverse pin plane (not shown) at what can be called the 315° positional location within the fourth quadrant.

As such, with the square die pin configuration, the second radial location of the die apparatus 103 can be considered four second radial locations with one of the second radial locations 227 located at the 45° positional location of the peripheral gap 211 with the remaining three second radial locations (not shown) respectively located at the 135°, 225°, and 315° positional locations of the peripheral gap 211.

As shown in FIG. 3, the die body 201 further includes an outer peripheral surface 307 facing away (e.g., along direction 309) from the extrusion axis 305 and circumscribing the extrusion face 205. As shown the outer peripheral surface 307 can comprise a frustoconical surface circumscribing the extrusion face 205. Still further, as shown in FIG. 3, the outer peripheral surface 307 can optionally be provided as a circular frustoconical surface although other surface shapes may be used in further examples. Therefore, as shown, in some examples the outer peripheral surface can comprise a circular frustoconical surface that comprises a truncated conical surface extending between the extrusion face 205 and a die body landing 401 (see FIG. 4). The die body landing 401 can likewise circumscribe the outer peripheral surface 307 and, in some examples, may comprise a surface that is substantially parallel to the extrusion face 205.

The discharge slots tend to have skin flow characteristics at different locations along the outer peripheral surface 307. For example, batch flow forming the skin ("skin batch flow") tends to have the lowest resistance at locations of the outer peripheral surface 307 that are aligned with one of the first slot plane 219a and the second slot plane 219b. In contrast, the skin batch flow tends to have the highest resistance at locations along the outer peripheral surface 307 that are aligned with a transverse pin plane (e.g., transverse pin plane 223).

The highest and lowest resistance to skin batch flow can be influenced, at least in part, by the die pin arrangement of the die body 201. For example, with the square pin configuration shown in FIG. 2, the honeycomb network of discharge slots 209 associated with the outer peripheral surface adjacent the first radial locations (e.g., 221a, 221b) at the 0°, 90°, 180°, and 270° positions of the peripheral gap 211 have the least resistance to skin batch flow. Indeed, the first radial locations can be considered the most aligned with the radial slots to receive an ample flow rate of skin batch flow that is relatively uninhibited by the die pins. In contrast, the honeycomb network of discharge slots 209 associated with the outer peripheral surface 307 adjacent the second radial locations (e.g., 227) at the 45°, 135°, 225°, and 315° positions of the peripheral gap 211 have the most resistance to skin batch flow. Indeed, the second radial locations are generally most misaligned with the radial slots, thereby receiving a relatively restricted flow rate of batch material that is relatively inhibited by the tortuous path produced by the die pin configuration at the second radial locations.

While the areas of least resistance are discussed with respect to the 0°, 90°, 180°, and 270° and the areas of most resistance are discussed with respect to the radial locations 45°, 135°, 225°, and 315°, such locations are for example purposes only. In further examples, it may be determined that the particular honeycomb extrusion apparatus may provide areas of least and/or most resistance at other locations. For example, the above-referenced examples are associated with circular honeycomb substrates. The areas of least and/or most resistance may be determined to occur at different locations for an oval, square, or other shaped honeycomb substrate. Moreover, further process considerations, such as influences from processes upstream from the die body may influence where the areas of most and/or least resistance occur. In such examples, aspects of the present disclosure can be used to provide custom compensation to provide desired relative skin flow characteristics (e.g., balanced skin flow characteristics) at different locations about the outer peripheral surface.

The honeycomb network of discharge slots 209 and/or other features of the honeycomb extrusion apparatus can therefore at least partially define a first skin flow characteristic at the first location of the outer peripheral surface 307. Likewise, the honeycomb network 207 of discharge slots 209 and/or other features of the honeycomb extrusion apparatus at least partially defines a second skin flow characteristic at a second location of the outer peripheral surface 307 that is spaced from the first location in a direction about the extrusion axis 305. For example, the skin flow characteristics can comprise a resistance of skin batch flow, a thickness of the skin, a volumetric flow rate of the skin batch flow, a velocity of the skin batch flow, a pressure of the skin batch flow, a viscosity of the skin batch flow, a rheology of the skin batch flow, batch particle orientation in the skin batch flow, or other characteristics. In one example, the first skin flow characteristic is different than the second skin flow characteristic.

In just one example, the skin flow characteristic can comprise a resistance of the skin batch flow, wherein the first skin flow characteristic (e.g., first skin batch flow resistance) at the first location of the outer peripheral surface 307 is less than the second skin flow characteristic (e.g., second skin batch flow) at the second location of the outer peripheral surface. In another example, the skin flow characteristic can comprise a thickness of the skin, wherein the first skin flow characteristic (e.g., first skin thickness) at the first location of the outer peripheral surface 307 is greater than the second skin flow characteristic (e.g., second skin thickness) at the second location of the outer peripheral surface. In another example, the skin flow characteristic can comprise a volumetric flow rate of the skin batch flow, wherein the first skin flow characteristic (e.g., first volumetric flow rate of the skin batch flow) at the first location of the outer peripheral surface 307 is greater than the second skin flow characteristic (e.g., second volumetric flow rate of the skin batch flow) at the second location of the outer peripheral surface. In yet another example, the skin flow characteristic can comprise a velocity of the skin batch flow, wherein the first skin flow characteristic (e.g., first velocity of the skin batch flow) at the first location of the outer peripheral surface 307 is greater than the second skin flow characteristic (e.g., second velocity of the skin batch flow) at the second location of the outer peripheral surface. In still another example, the skin flow characteristic can comprise a pressure of the skin batch flow, wherein the first skin flow characteristic (e.g., first pressure of the skin batch flow) at the first location of the outer peripheral surface 307 is greater than the second skin flow characteristic (e.g., second pressure of the skin batch flow) at the second location of the outer peripheral surface.

Figure 4:
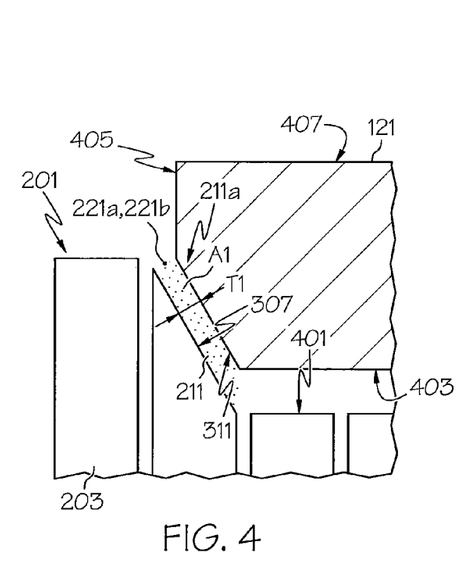
FIG. 4 is an enlarged view of portions of FIG. 3.

As shown in FIG. 2, the die apparatus 103 can also include a mask 121 that may be, for example, removably mounted with respect to the die body 201. As shown in FIG. 3, the mask 121 includes an inner peripheral surface 311 at least partially circumscribing the outer peripheral surface 307 of the die body 201. As shown in FIG. 4, the inner peripheral surface 311 can comprise a frustoconical surface that can comprise a truncated surface extending between an inwardly facing surface 403 and a skin facing edge surface 405 of the mask 121. Although not shown, in further examples, the frustoconcial surface can comprise a truncated surface extending between the inwardly facing surface 403 and an outwardly facing surface 407 of the mask 121.

Figure 6:
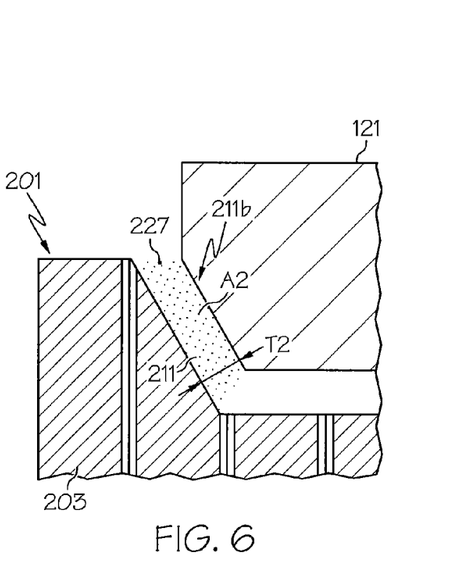
FIG. 6 is an enlarged view of portions of FIG. 5.

As shown in FIG. 4, the peripheral gap 211 can defined between the inner peripheral surface 311 of the mask 121 and the outer peripheral surface 307 of the die body 201, wherein the peripheral gap 211 circumscribes the array of die pins 203. The peripheral gap 211 can have varying cross-sectional area configurations about the peripheral gap 211. For example, as shown in FIG. 4, the peripheral gap 211 can include a first extrusion cross section 211a at the first radial locations (e.g., 221a, 221b) relative to the extrusion axis 305. Moreover, as shown in FIG. 6, the peripheral gap 211 can include a second extrusion cross section 211b at the second radial locations (e.g., 227) relative to the extrusion axis 305. As shown by the respective patterns in the figures, the overall flow area A1 of the first extrusion cross section 211a is less than an overall flow area A2 of the second extrusion cross section 211b.

Still further, the extrusion cross sections can include a transverse thickness between the outer peripheral surface 307 of the die body 201 and the inner peripheral surface 311 of the mask 121. As shown, the transverse thickness T1 of the first extrusion cross section 211a can be less than the transverse thickness T2 of the second extrusion cross section. In one example, T1 can be from about 0.01 inches to about 0.024 inches. In another example, T2 can be from about 0.015 inches to about 0.022 inches. In still further examples the difference between the transverse thicknesses ΔT, where ΔT=T2−T1, can be from about −0.012 inches to about 0.012 inches, for example from about −0.004 inches to about 0.004 inches.

Providing a difference in overall flow areas A1, A2 and or a difference in the transverse thicknesses T1, T2 can help balance the differences in skin flow characteristics associated with the particular honeycomb network of discharge slots 209 to provide a more uniform skin flow characteristic throughout the peripheral gap 211.

For example, as mentioned previously, the honeycomb network of discharge slots 209 can result in less restriction of skin batch flow at the first radial locations (e.g., 221a, 221b). As such, the outer peripheral surface 307 of the die body 201 and/or the inner peripheral surface 311 of the mask 121 can be designed to provide a smaller overall flow area A1 and/or smaller transverse thickness T1 of the peripheral gap 211 at the first radial locations (e.g., 221a, 221b) to restrict skin batch flow through the peripheral gap in these regions. As such, the reduced resistance to skin batch flow due to the honeycomb network of discharge slots 209 at the first radial locations can be balanced by an increased resistance to skin batch flow due to the reduced overall flow area A1 and/or the reduced transverse thickness T1.

Still further, as mentioned previously, the honeycomb network of discharge slots 209 can result in more restriction of skin batch flow at the second radial locations (e.g., 227). As such, the outer peripheral surface 307 of the die body 201 and/or the inner peripheral surface 311 of the mask 121 can be designed to provide a larger overall flow area A2 and/or larger transverse thickness T2 of the peripheral gap 211 at the second radial locations (e.g., 227) to reduce resistance to skin batch flow through the peripheral gap in these regions. As such, the increased resistance to skin batch flow due to the honeycomb network of discharge slots 209 at the second radial locations can be balanced by a reduced resistance to skin batch flow due to the increased overall flow area A2 and/or the increased transverse thickness T2.

Figure 7:
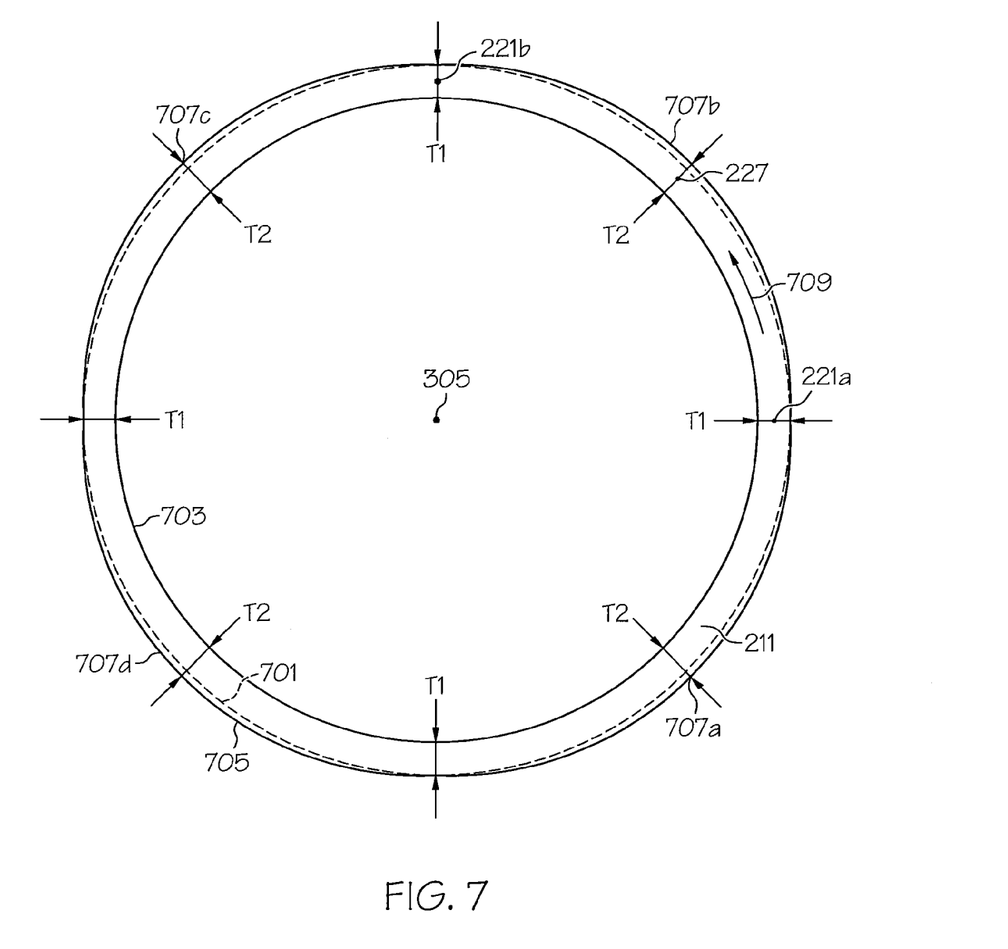
FIG. 7 is an example profile view of an outer peripheral surface of a die body compared to an inner peripheral surface of a mask.

Configuring the outer peripheral surface 307 and/or the inner peripheral surface 311 to provide differences in overall flow areas and/or differences in transverse thicknesses can be achieved in a wide range of ways. For instance, the die apparatus 103 may be configured such that the inner peripheral surface 311 is not geometrically similar with the outer peripheral surface 307. For example, FIG. 7 shows exaggerated profiles of the inner and outer peripheral surfaces with respect to an imaginary circle 701. In the illustrated example, an inner profile 703 can be associated with the outer peripheral surface 307 of the die body 201. As shown, the inner profile 703 of the outer peripheral surface 307 can comprise a circle that is concentric with the imaginary circle 701. In such an example, the frustoconical surface of the outer peripheral surface 307 can comprise a circular frustoconical surface. As further shown in FIG. 7, the exaggerated profiles further demonstrate an outer profile 705 of the inner peripheral surface 311 of the mask 121. As shown, the outer profile 705 comprises a non-circular curvilinear shape with four lobes 707a, 707b, 707c, 707c equally spaced from one another. In such an example, the frustoconcial surface of the inner peripheral surface 311 comprises a lobed frustoconical surface. Moreover, with the square die pin configuration, the lobed frustoconical surface can comprise four lobed portions substantially equally spaced from one another about the extrusion axis 305 of the die body 201.

Although not shown, in further examples, the inner peripheral surface 311 of the mask 121 can comprise a circular frustoconical surface while the outer peripheral surface 307 of the die body 201 can comprise the lobed frustoconical surface. Moreover, as demonstrated in FIG. 7, the overall flow area and/or the thicknesses of extrusion cross sections of the peripheral gap 211 substantially continuously changes in a direction 709 about the extrusion axis 305 between the first and second radial locations. For example, the overall flow area and thickness continuously increases between the first radial location 221a and the second radial location 227. The overall flow area and thickness also continuously decreased between the second radial location 227 and the first radial location 221b. As such, in some examples, the overall flow area and thickness may continuously change along direction 709 by increasing from a first radial location to a second radial location and then decreasing between the second radial location and the first radial location along direction 709. While stepped increasing/decreasing is contemplated, providing continuously changing overall flow areas and/or thicknesses can help smooth the flow characteristics without disrupting the skin batch flow.

Figure 8:
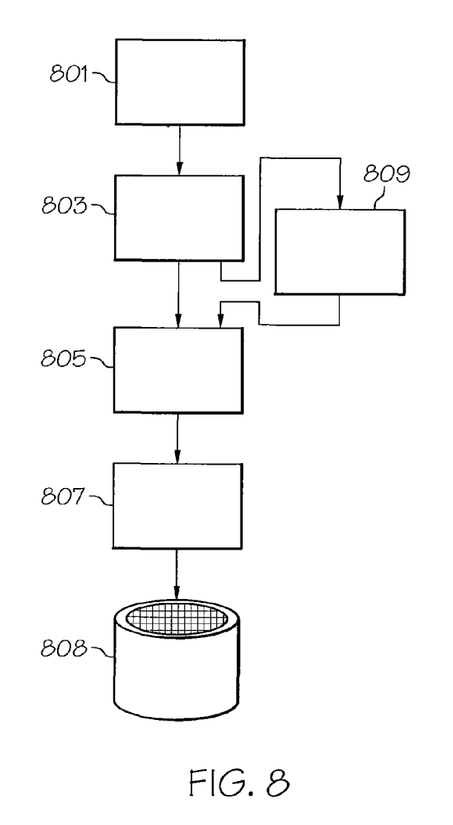
FIG. 8 is a flow chart illustrating steps of example methods in accordance with aspects of the disclosure.

Methods of co-extruding a central portion of a honeycomb body with an integral skin will now be described with reference to the flow chart in FIG. 8. In one example, the method can begin with the step 801 of providing the die body 201 including the array of die pins 203 that are spaced apart to define the extrusion face 205 with the honeycomb network 207 of discharge slots 209 extending along the extrusion axis 305 of the die body 201. The die body 201 can further include the outer peripheral surface 307 facing away from the extrusion axis 305 and circumscribing the extrusion face 205. The honeycomb network 207 of discharge slots 209 can at least partially define a first skin flow characteristic at a first location of the outer peripheral surface 307. Furthermore, the honeycomb network 207 of discharge slots 209 can at least partially define a second skin flow characteristic at a second location of the outer peripheral surface 307 that is spaced from the first location in a direction 709 about the extrusion axis 305. The first skin flow characteristic can be different than the second skin flow characteristic.

In one example, the step 801 can provide the first set of the plurality of discharge slots 209 to each extend along the slot direction 217a and the first slot plane 219a extends along the slot direction 217a and includes the first location of the outer peripheral surface 307, and the second plane 223 does not extend along the slot direction 217a and includes the second location of the outer peripheral surface 307. In one example, the second plane 223 intersects the first plane 219a at an angle α of about 45° although other angles may be provided depending on the slot configuration, honeycomb substrate shape, upstream process conditions and/or other features of the honeycomb extrusion apparatus.

The method then continues to the step 803 of providing the mask including the inner peripheral surface 311. The method then includes the step 805 of mounting the mask 121 to the die body 201 such that the inner peripheral surface 311 at least partially circumscribes the outer peripheral surface 307 of the die body 201 to define the peripheral gap 211 between the inner peripheral surface 311 and the outer peripheral surface 307 that circumscribes the array of die pins 203. The peripheral gap 211 includes a first extrusion cross section 211a associated with the first location of the outer peripheral surface 307, and the peripheral gap 211 includes a second extrusion cross section 211b associated with the second location of the outer peripheral surface 307. The overall flow area A1 of the first extrusion cross section 211a is less than the overall flow area A1 of the second extrusion cross section 211b. The method then includes the step 807 of extruding a quantity of batch material 113 through an overall peripheral flow area of the peripheral gap 211 while extruding another quantity of the batch material 113 through the honeycomb network 207 of discharge slots 209 such that a central portion of the honeycomb body is co-extruded with an integral skin defining an outer periphery of the honeycomb body as schematically shown by 808 resulting from step 807.

The method can optionally include the step 809 of configuring the first extrusion cross section 211a and the second extrusion cross section 211b to at least partially compensate for the difference between the first skin flow characteristic and the second skin flow characteristic. For example, the step 809 of configuring can include configuring one of the inner peripheral surface 311 and the outer peripheral surface 307 such that the inner peripheral surface 311 is not geometrically similar with the outer peripheral surface 307. For instance, step 809 can provide one of the outer peripheral surface 307 and the inner peripheral surface 311 with a circular frustoconical surface. Step 809 can also include the step of providing one of the inner peripheral surface 311 and the outer peripheral surface 307 with a lobed frustoconical surface. For instance, step 809 can provide one of the outer and inner peripheral surfaces as a circular frustoconical surface and the other of the outer and inner peripheral surface as a lobed frustoconical surface. If provided, lobed frustoconical surface can comprise four lobed portions substantially equally spaced from one another about the extrusion axis 305 of the die body 201. In further examples, the number and locations of the lobed portions may be different depending on the slot configuration, honeycomb substrate shape, upstream process conditions and/or other features of the honeycomb extrusion apparatus. For example, the lobed portions may be unequally spaced in some examples. In further examples, more or less than four lobed portions may be provided.

Figure 9:
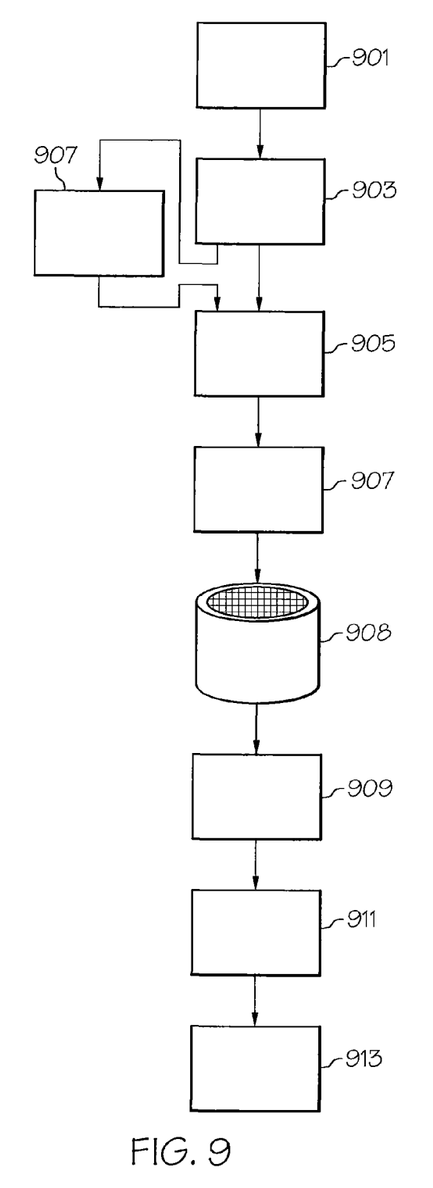
FIG. 9 is another flow chart illustrating steps of example methods in accordance with aspects of the disclosure.

Methods of compensating for different skin flow characteristics associated with a particular honeycomb network 207 configuration of discharge slots in a die body will now be described with reference to the flow chart in FIG. 9. In one example, the method can begin with the step 901 of providing the die body 201 including the array of die pins 203 that are spaced apart to define the extrusion face 205 with the honeycomb network 207 of discharge slots 209 extending along the extrusion axis 305 of the die body 201. The die body 201 further includes the outer peripheral surface 307 facing away from the extrusion axis 305 and circumscribing the extrusion face 205. The honeycomb network 207 of discharge slots 209 defines the first skin flow characteristic at the first location of the outer peripheral surface 307 and the second skin flow characteristic at the second location of the outer peripheral surface 307 spaced from the first location in the direction 709 about the extrusion axis 305.

The method then continues with the step 903 of providing the mask 121 including the inner peripheral surface 311 and then the step 905 of mounting the mask 121 to the die body 201 such that the inner peripheral surface 311 at least partially circumscribes the outer peripheral surface 307 of the die body 201 to define the peripheral gap 211 between the inner peripheral surface 311 and the outer peripheral surface 307 that circumscribes the array of die pins 203. The peripheral gap 211 includes the first extrusion cross section 211a associated with the first location of the outer peripheral surface 307. The peripheral gap 211 further includes the second extrusion cross section 211b associated with the second location of the outer peripheral surface 307. The overall flow area A1 of the first extrusion cross section 211a is arranged to be less than an overall flow area A2 of the second extrusion cross section 211b to at least partially compensate for a difference between the first skin flow characteristic and the second skin flow characteristic.

Optionally, prior to step 905, the method can further include the step 907 of machining the inner peripheral surface 311 of the mask 121 to selectively provide the predetermined configuration for the first extrusion cross section 211a and the second extrusion cross section 211b to at least partially compensate for the difference between the first skin flow characteristic and the second skin flow characteristic.

In one example, the method can conclude with step 905. Alternatively, the method can continue with step 907 of co-extruding the honeycomb body with an integral skin shown by 908 resulting from step 907. The method can then continue with step 909 of measuring at least one skin characteristic of the integral skin at a plurality of peripheral locations about the periphery of the honeycomb body. For example, the step can measure the skin thickness of the skin corresponding to the first and second radial locations. The method can then include the step 911 of analyzing differences in the skin characteristics at the plurality of peripheral locations. For example, step 911 can include analyzing the differences in skin thicknesses at the plurality of peripheral locations. The method can then include the step 913 of manufacturing a new mask with an inner peripheral surface that is different than the inner peripheral surface 311 of the mask 121 provided in step 903 to compensate for the differences in skin characteristics analyzed during step 911. As such, subsequent fine tuning of the mask may be carried out to further achieve uniformity in the skin characteristics of the honeycomb body. While modification may be carried out with the die body, modifying the mask may be carried out with certain examples since the mask is generally less expensive to replace than the die body.

FIGS. 10 and 11 are experimental results demonstrating improvement in skin thickness uniformity in accordance with aspects of the disclosure. FIG. 10 shows measurements of skin thickness associated with a honeycomb body using a conventional die apparatus. As shown, the measurements demonstrate the observation that the thicknesses of the skin at the 0°, 90°, 180°, and 270° locations are generally greater than the thicknesses at the 45°, 135°, 225°, and 315° locations.

FIG. 11 shows measurements of skin thickness associated with a honeycomb body using a die apparatus 103 in accordance with aspects of the disclosure. As shown, the measurements of skin thickness show a more uniform thickness at the 0°, 45° 90°, 135°, 180°, 225°, 270° and 315° locations.

It will be apparent to those skilled in the art that various modifications and variations can be made to the described embodiments without departing from the spirit and scope of the claimed invention. Thus, it is intended that the present claimed invention cover the modifications and variations of the embodiments described herein provided they come within the scope of the appended claims and their equivalents.

What is claimed is:

1. A method of co-extruding a central portion of a honeycomb body with an integral skin, the method comprising the steps of:
   (I) providing a die body including an array of pins that are spaced apart to define an extrusion face with a honeycomb network of discharge slots extending along an extrusion axis of the die body, the die body further including an outer peripheral surface facing away from the extrusion axis and circumscribing the extrusion face, wherein the honeycomb network of discharge slots at least partially defines a first resistance to a skin batch flow at a first location of the outer peripheral surface, the honeycomb network of discharge slots at least partially defines a second resistance to the skin batch flow at a second location of the outer peripheral surface that is spaced from the first location in a direction about the extrusion axis, wherein the first resistance is less than the second resistance;
   (II) providing a mask including an inner peripheral surface;
   (III) mounting the mask to the die body such that the inner peripheral surface at least partially circumscribes the outer peripheral surface of the die body to define a peripheral gap between the inner peripheral surface and the outer peripheral surface that circumscribes the array of pins, and wherein the peripheral gap includes a first extrusion cross section associated with the first location of the outer peripheral surface, and the peripheral gap includes a second extrusion cross section associated with the second location of the outer peripheral surface, wherein an overall flow area of the first extrusion cross section is less than an overall flow area of the second extrusion cross section; and
   (IV) extruding a quantity of batch material through an overall peripheral flow area of the peripheral gap while extruding another quantity of the batch material through the honeycomb network of discharge slots such that a central portion of the honeycomb body is co-extruded with an integral skin defining an outer periphery of the honeycomb body.

2. The method of claim 1, further comprising the step of configuring the first extrusion cross section and the second extrusion cross section to at least partially compensate for a difference between the first resistance and the second resistance.

3. The method of claim 2, wherein the step of configuring includes configuring one of the inner peripheral surface and the outer peripheral surface such that the inner peripheral surface does not have the same shape as the outer peripheral surface.

4. The method of claim 3, wherein the step of configuring provides one of the outer peripheral surface and the inner peripheral surface with a circular frustoconical surface.

5. The method of claim 3, wherein the step of configuring provides one of the inner peripheral surface and the outer peripheral surface with a lobed frustoconical surface.

6. The method of claim 5, wherein the lobed frustoconical surface comprises four lobed portions substantially equally spaced from one another about the extrusion axis of the die body.

7. The method of claim 1, wherein a first set of the plurality of discharge slots each extend along a slot direction and a first plane extends along the slot direction and includes the first location of the outer peripheral surface, and a second plane does not extend along the slot direction and includes the second location of the outer peripheral surface.

8. The method of claim 7, wherein the second plane intersects the first plane at about a 45° angle.

9. A method of compensating for different skin flow characteristics associated with a particular honeycomb network configuration of discharge slots in a die body comprising the steps of:
   (I) providing a die body including an array of pins that are spaced apart to define an extrusion face with a honeycomb network of discharge slots extending along an extrusion axis of the die body, the die body further including an outer peripheral surface facing away from the extrusion axis and circumscribing the extrusion face, wherein the honeycomb network of discharge slots defines a first resistance to a skin batch flow at a first location of the outer peripheral surface and a second resistance to a skin batch flow at a second location of the outer peripheral surface spaced from the first location in a direction about the extrusion axis;
   (II) providing a mask including an inner peripheral surface; and
   (III) mounting the mask to the die body such that the inner peripheral surface at least partially circumscribes the outer peripheral surface of the die body to define a peripheral gap between the inner peripheral surface and the outer peripheral surface that circumscribes the array of pins, and wherein the peripheral gap includes a first extrusion cross section associated with the first location of the outer peripheral surface, and the peripheral gap includes a second extrusion cross section associated with the second location of the outer peripheral surface, wherein an overall flow area of the first extrusion cross section is arranged to be less than an overall flow area of the second extrusion cross section to at least partially compensate for a difference between the first resistance and the second resistance.

10. The method of claim 9, wherein, prior to step (III), further comprising the step of machining the inner peripheral surface of the mask to selectively provide a predetermined configuration for the first extrusion cross section and the second extrusion cross section to at least partially compensate for the difference between the first resistance and the second resistance.

11. The method of claim 9, further comprising the steps of:
   (IV) co-extruding a honeycomb body with an integral skin;
   (V) measuring at least one skin characteristic of the integral skin at a plurality of peripheral locations about the periphery of the honeycomb body;
   (VI) analyzing differences in the skin characteristics at the plurality of peripheral locations; and
   (VII) manufacturing a new mask with an inner peripheral surface that is different than the inner peripheral surface of the mask provided in step (III) to compensate for the differences in skin characteristics analyzed during step (VI).

* * * * *